W. H. HARRISS.
ADJUSTING MEANS.
APPLICATION FILED FEB. 8, 1917.
1,270,615.
Patented June 25, 1918.
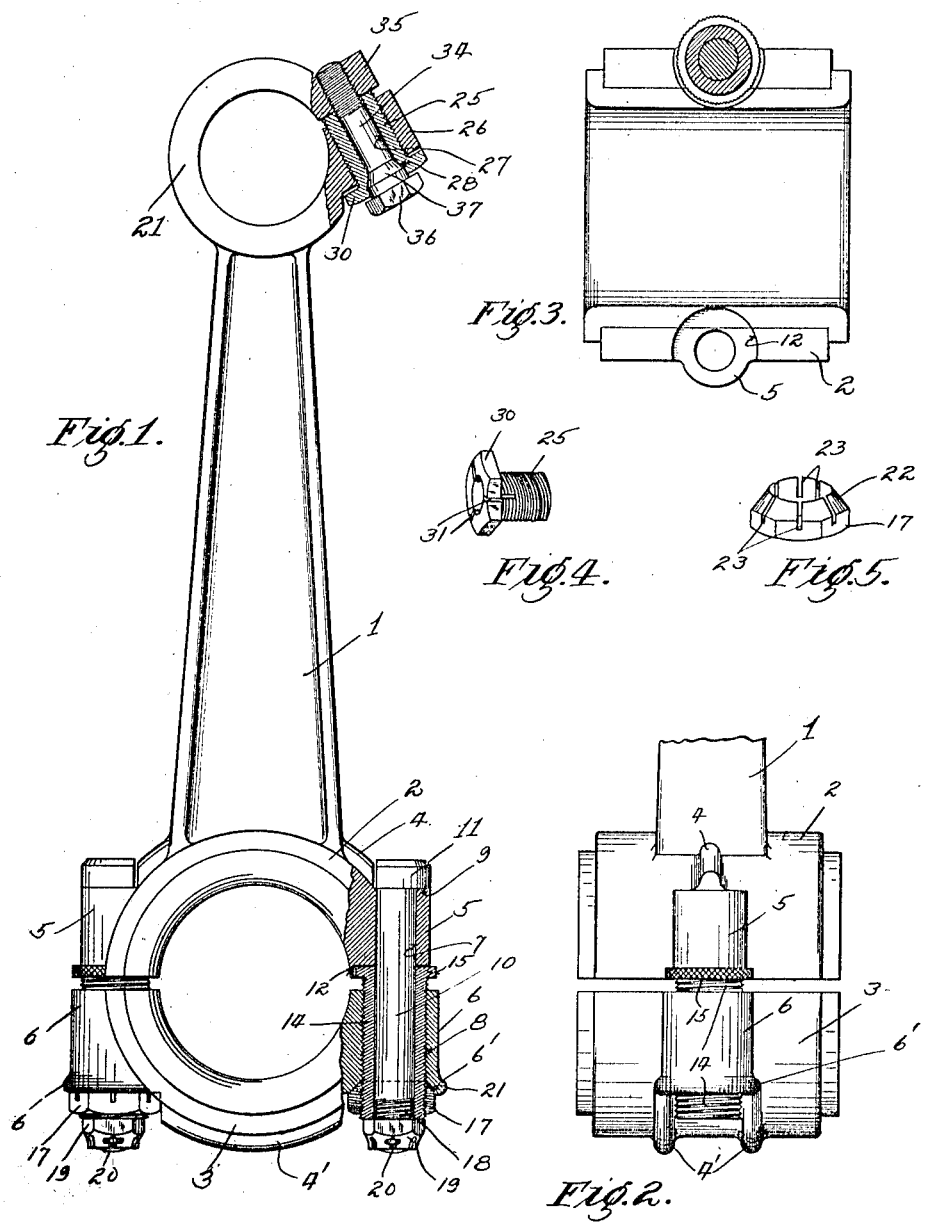
INVENTOR
Walter H. Harriss
BY
ATTORNEY

UNITED STATES PATENT OFFICE.

WALTER H. HARRISS, OF OAKLAND, CALIFORNIA.

ADJUSTING MEANS.

1,270,615.   Specification of Letters Patent.   Patented June 25, 1918.

Application filed February 8, 1917. Serial No. 147,485.

*To all whom it may concern:*

Be it known that I, WALTER H. HARRISS, a citizen of the United States, residing at 118 12th St., in the city of Oakland, county of Alameda, and State of California, have invented certain new and useful Improvements in Adjusting Means, of which the following is a specification.

This invention relates to improved adjusting means particularly adapted for the bearings of connecting rods and like journals.

While I have shown the devices applied to the ends of a connecting rod it will be understood that the same may be used wherever two parts are required to be adjustable relative to each other.

The principal objects of my invention are to provide means whereby two parts may be held in adjusted spaced relation, this relation between the parts quickly and minutely changed and the parts substantially locked in fixed relation so that the adjustment is permanently maintained.

Another object of the invention is to so construct the device that the bearing may be taken apart and then reassembled with the parts having their former adjusted relations.

A still further object of the invention is to so arrange the parts that the nut of the holding bolt always takes the same position on the screw threads whereby locking means may be more easily used to hold it in position.

With these and other objects in view the invention consists of certain novel features of construction, combinations and arrangements of parts hereinafter described and more specifically pointed out in the appended claims; it being understood that changes in form, proportion, size and minor details of construction, within the scope of the claims may be resorted to without departing from the spirit of the invention or sacrificing any of the advantages thereof.

To more fully comprehend the invention reference should be had to the drawings forming a part of the specifications and wherein:

Figure 1 is a view partly in end elevation and partly in section of a connecting rod showing the application of my adjusting means thereto.

Fig. 2— is a view in side elevation of the crank shaft end of the connecting rod.

Fig. 3— is a view through the center of the bearing, the cap being removed and the adjusting bolts on one side being shown in section.

Fig. 4— is a detailed view in perspective of the adjusting sleeve used on the piston end of the connecting rod.

Fig. 5— is a similar view of a lock nut used in connection with the adjusting sleeve of the crank bearing.

Referring to the corresponding parts in the several views by the same numerals of reference: 1 denotes a connecting rod having the half bearing 2 formed on one end and the bearing 21 for the cross-head pin formed on the other end. The cap for half bearing 2 is denoted by 3. The members 2 and 3 are provided with circumferential ribs 4 and 4' respectively, and the laterally extending lugs 5 and 6, which in turn are provided with holes 7 and 8 respectively. The holding bolt is denoted by 10, the head 11 whereof has a segmental portion cut from the circumference so that the arc shaped portion remaining, substantially covers the seat 9 in such a manner that the bolt will not turn. The inner face of the lug 5 is recessed as shown at 12, this recess being adapted to receive the flanged head 15 of the sleeve 14. The latter has screw threads that are adapted to engage corresponding screw threads formed in the surface of opening 8. It will be noted that the radius of head 15 is greater than that of the lug 5 whereby this head will extend slightly beyond the contour of the lug enabling it to be easily turned for the purpose of adjustment. The circumferential edge of the head may be milled, knurled, or otherwise roughened to furnish a secure gripping surface.

The outer ends of lugs 6 are provided with conical recesses 21 concentric with openings 8, in which the lock nuts 17 having conical faces 22 are adapted to seat. These nuts are also provided with slits 23 extending from the smaller ends of the nuts about half way through. These nuts engage the threaded ends of sleeves 14, the latter being of sufficient length to extend slightly through the nut. Each sleeve 14 is provided with a longitudinal unthreaded opening through which the bolt 10 passes and this bolt is screw threaded on its outer end, as shown at 18, and provided with a castellated nut 19 which is firmly seated on the end of a sleeve 15 and held in this position by means of a cotter pin 20.

The modified form of the device used in connection with the crosshead pin consists of a sleeve 25 in threaded engagement with lug 26. This sleeve is provided with an unthreaded opening 27, the outer end of which is provided with the conical counter-bore 28. An enlarged head 30 is formed on this end of the sleeve and a plurality of slits 31 extend from the face of this head partly along the sleeve.

Passing through opening 27 is a bolt 34 the threaded end of which is in threaded engagement with lug 35. This bolt is provided with the square or hexagonal head 36 under which is the conical shoulder 37 closely fitted in the recess 28.

In use; adjustment is made on the bearing 2 by loosening lock-nut 17 and turning the sleeve 14 by means of its knurled head. If nut 19 is set hard against the end of sleeve 15 it will also be necessary to unloosen this nut. When the sleeve is turned, cap 3 is moved according to the direction of rotation either to or from the other half bearing. When the required adjustment is secured locknut 17 is tightened in place and holds the sleeve against further movement. The conical face of this nut serves to force these surfaces into intimate contact and also to clamp the nut on the bolt.

Now if the bearing is taken apart this sleeve is held in the lug 6 and in reassembling the parts head 15 will seat in the recess 12 and again position the cap as before taking apart.

In adjusting the form shown on the upper end of the connecting rod, bolt 34 is slackened off by turning in the lug 35. Sleeve 25 is then turned the required amount to secure the necessary adjustment and is held in this position while the screw 34 is again tightened. This causes the lug 35 to be pulled tightly against the end of the sleeve and at the same time forces the conical shoulder 37 into the recess 28 whereby the outer end of the sleeve 25 is spread sufficiently that it fits tightly within its threaded opening. This forcing of the sleeve against the threaded walls of the threaded opening in lug 36 not only prevents the sleeve itself from turning, but also prevents any movement due to looseness of contact between the external threads on the sleeve and the internal threads of the lug.

It will thus be seen that I have provided an improved adjusting means whereby accurate and permanent adjustment may be secured between two adjacent members and I claim as new and wish to cover by Letters Patent:

1. Means for adjustably holding the parts of a two piece bearing comprising lugs on each part of said bearing, the lugs of one of said parts having recesses formed on their inner faces, tubular sleeves in threaded engagement with the lugs of the other of said parts, enlarged heads on said sleeves adapted to seat in said recesses, and extending beyond the lugs containing said recesses, bolts extending through the lugs of said first mentioned part and through said sleeves, and provided on their opposite ends with opposed clamping means for holding the said parts together.

2. Means for holding two parts of a bearing in adjusted spaced relation comprising laterally extending lugs on each of said parts, having openings in axial alinement and the openings in the lugs of one part being screwthreaded and larger than the openings in the lugs of the other part, tubular sleeves extending through and engaging with said screw-threaded openings, enlarged heads on said sleeves adapted to abut against the lugs of the said other part, said heads being adapted to extend beyond said abutting lugs, lock-nuts engaging said tubular sleeves, bolts extending through the lugs of the said other part and through said tubular sleeves, nuts on the ends of said bolts adapted to seat on the ends of said sleeves, and means for locking said last mentioned nuts.

3. Means for adjusting two adjacent parts, comprising a laterally extending lug on each of said parts, a tubular sleeve in threaded engagement with one of said lugs and having one end abutting against the other of said lugs, an enlarged head on one end of said sleeve extending beyond the lug against which it abuts, a bolt extending through said tubular sleeve and the other of said lugs for holding the said parts clamped together.

4. Means for adjusting two adjacent parts comprising a tubular sleeve in threaded engagement with one of said parts and having one end abutting against the other of said parts, said first mentioned part having a conical recess, a bolt extending through said sleeve and engaging the other of said parts, a locking nut in threaded engagement with said bolt and abutting against the end of said sleeve, a locking nut for said sleeve, a conical face for said last mentioned nut having radial slits, said face being adapted to set in the aforesaid recess.

In testimony whereof I affix my signature.

WALTER H. HARRISS.